US010115032B2

(12) United States Patent
Chandraker et al.

(10) Patent No.: US 10,115,032 B2
(45) Date of Patent: Oct. 30, 2018

(54) UNIVERSAL CORRESPONDENCE NETWORK

(71) Applicant: NEC Laboratories America, Inc., Princeton, NJ (US)

(72) Inventors: Manmohan Chandraker, Santa Clara, CA (US); Christopher Bongsoo Choy, Stanford, CA (US); Silvio Savarese, Stanford, CA (US)

(73) Assignee: NEC Corporation (JP)

( * ) Notice: Subject to any disclaimer, the term of this patent is extended or adjusted under 35 U.S.C. 154(b) by 96 days.

(21) Appl. No.: 15/342,700

(22) Filed: Nov. 3, 2016

(65) Prior Publication Data

US 2017/0124711 A1    May 4, 2017

Related U.S. Application Data

(60) Provisional application No. 62/250,877, filed on Nov. 4, 2015.

(51) Int. Cl.
| | | |
|---|---|---|
| *G06K 9/00* | (2006.01) | |
| *G06K 9/42* | (2006.01) | |
| *G06K 9/46* | (2006.01) | |
| *G06N 3/08* | (2006.01) | |
| *G06N 3/04* | (2006.01) | |

(52) U.S. Cl.
CPC ........... *G06K 9/42* (2013.01); *G06K 9/00201* (2013.01); *G06K 9/4628* (2013.01); *G06N 3/0454* (2013.01); *G06N 3/08* (2013.01); *G06T 2207/20081* (2013.01); *G06T 2207/20084* (2013.01)

(58) Field of Classification Search
CPC .... G06K 9/42; G06K 9/00201; G06K 9/4628; G06N 3/08; G06T 7/0042; G06T 2207/20081; G06T 2207/20084
See application file for complete search history.

(56) References Cited

U.S. PATENT DOCUMENTS

| 2003/0126622 | A1* | 7/2003 | Cohen | G01S 3/7865 |
| | | | | 725/135 |
| 2007/0055153 | A1 | 3/2007 | Simopoulos et al. | |
| 2008/0043144 | A1* | 2/2008 | Amir | G06K 9/00711 |
| | | | | 348/469 |
| 2017/0098162 | A1* | 4/2017 | Ellenbogen | H04L 43/04 |
| 2017/0140514 | A1* | 5/2017 | Amirghodsi | G06T 5/50 |

(Continued)

OTHER PUBLICATIONS

Bell, Sean, and Kavita Bala. "Learning visual similarity for product design with convolutional neural networks." ACM Transactions on Graphics (TOG) 34.4 (2015): 98.*

(Continued)

*Primary Examiner* — Jonathan S Lee
(74) *Attorney, Agent, or Firm* — Joseph Kolodka (57) ABSTRACT

A computer-implemented method for training a convolutional neural network (CNN) is presented. The method includes extracting coordinates of corresponding points in the first and second locations, identifying positive points in the first and second locations, identifying negative points in the first and second locations, training features that correspond to positive points of the first and second locations to move closer to each other, and training features that correspond to negative points in the first and second locations to move away from each other.

15 Claims, 5 Drawing Sheets

(56) References Cited

U.S. PATENT DOCUMENTS

2017/0147905 A1* 5/2017 Huang ................ G06K 9/6232
2017/0228641 A1* 8/2017 Sohn ....................... G06N 3/08

OTHER PUBLICATIONS

Sønderby, Søren Kaae, et al. "Recurrent spatial transformer networks." arXiv preprint arXiv:1509.05329 (2015).*

Zagoruyko, et al., "Learning to Compare Image Patches via Convolutional Neural Networks". The IEEE Conference on Computer Vision and Pattern Recognition (CVPR 2015) Apr. 4, 2015. pp. 4353-4361.

David G. Lowe, "Distinctive Image Features from Scale-Invariant Keypoints". International Journal of Computer Vision, 2004. Jan. 5, 2004. pp. 1-28.

Sean Bell et al., "Learning Visual Similarity for Product Design with Convolutional Neural Networks", Journal of ACM Transactions on Graphics (TOG)—Proceedings of ACM SIGGRAPH 2015, vol. 34, issue 4, Aug. 2015 (see p. 5; and figure 9).

Soren Kaae Sonderby et al., "Recurrent Spatial Transformer Networks", Cornell University, Computer Vision and Pattern Recognition (cs, CV) Sep. 17, 2015 (see p. 1).

* cited by examiner

UNIVERSAL CORRESPONDENCE NETWORK

RELATED APPLICATION INFORMATION

This application claims priority to Provisional Application No. 62/250,877, filed on Nov. 4, 2015, incorporated herein by reference in its entirety.

BACKGROUND

Technical Field

The present invention relates to image processing and, more particularly, to end-to-end fully convolutional feature learning for geometric and semantic correspondences, but are not limited to those.

Description of the Related Art

In a visual correspondence problem, one is given a set of images that contain an overlapping 3D region and asked to find the location of the projection of 3D points in all images. This problem arises in some computer vision applications including stereo disparity, structure from motion, panorama stitching, image representation, image retrieval, as well as more complicated tasks such as classification and detection.

To solve the visual correspondence problem, many hand-designed features have been proposed. Recently, with the advent of a powerful convolutional neural network (CNN), many researchers returned to the problem with this new tool. Rather than learning features, CNN can do end-to-end classification of patch similarity.

Once the CNN is trained, intermediate convolution layer features are used as a low dimensional feature. However, intermediate convolution features are not optimized for the visual correspondence task. The features are trained for a surrogate objective function (patch similarity), and intermediate features do not necessarily form a metric space conducive to performing visual correspondence. In addition, the patch similarity is inherently inefficient and slow. Since it is a patch-based method, features have to be extracted again even for the overlapping regions. Also, it requires $O(n^2)$ feed-forward passes to compare each of n patches with n other patches in a different image. Still, the patch-based similarity has been a preferred method for several reasons. First, since all the benchmarks only require image patch similarity, optimizing the system for patch similarity (classification) would yield better results than learning a metric space (metric learning). Second, since the neural network is good at abstracting fine details, CNN is an appropriate tool for measuring global similarity.

SUMMARY

A system of a convolutional neural network and a training method for visual correspondence is presented. The system converts an image to dense features which can be used for various correspondence tasks. The feature space generates a metric space wherein distance operation captures visual similarity. The system is fully convolutional and can generate features for an arbitrary sized input and allow for efficient feature extraction. Active hard negative mining with metric learning are used to train the network.

A computer-implemented method for training a convolutional neural network (CNN) is presented. The method includes extracting coordinates of corresponding points in the first and second locations, identifying positive points in the first and second locations, identifying negative points in the first and second locations, training features that correspond to positive points of the first and second locations to move closer to each other, and training features that correspond to negative points in the first and second locations to move away from each other.

A system for training a convolutional neural network (CNN) is presented. The system includes a memory and a processor in communication with the memory, wherein the processor is configured to extract coordinates of corresponding points in the first and second locations, identify positive points in the first and second locations, identify negative points in the first and second locations, train features that correspond to positive points of the first and second locations to move closer to each other, and train features that correspond to negative points in the first and second locations to move away from each other.

A non-transitory computer-readable storage medium comprising a computer-readable program for training a convolutional neural network (CNN) is presented, wherein the computer-readable program when executed on a computer causes the computer to perform the steps of extracting coordinates of corresponding points in the first and second locations, identifying positive points in the first and second locations, identifying negative points in the first and second locations, training features that correspond to positive points of the first and second locations to move closer to each other, and training features that correspond to negative points in the first and second locations to move away from each other.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Correspondence estimation is the workhorse that drives several fundamental problems in computer vision, such as 3D reconstruction, image retrieval or object recognition. Applications such as structure from motion or panorama stitching that demand sub-pixel accuracy rely on sparse key point matches using descriptors. In other cases, dense correspondences in the form of stereo disparities, optical flow or dense trajectories are used for applications such as surface reconstruction, tracking, video analysis or stabilization. In yet other scenarios, correspondences are sought not between projections of the same 3D point in different images, but between semantic analogs across different instances within a category, such as beaks of different birds or headlights of cars. Thus, in its most general form, the notion of visual correspondence estimation spans the range from low-level feature matching to high-level object or scene understanding.

Traditionally, correspondence estimation relies on hand-designed features or domain-specific priors. In recent years, there has been an increasing interest in leveraging the power of convolutional neural networks (CNNs) to estimate visual correspondences. For example, a Siamese network may take a pair of image patches and generate their similarity as the output. Intermediate convolution layer activations from the above CNNs are also usable as generic features.

However, such intermediate activations are not optimized for the visual correspondence task. Such features are trained for a surrogate objective function (patch similarity) and do not necessarily form a metric space for visual correspondence and thus, any metric operations such as distance does not have explicit interpretation. In addition, patch similarity is inherently inefficient, since features have to be extracted even for overlapping regions within patches. Further, it requires $O(n^2)$ feed-forward passes to compare each of n patches with n other patches in a different image.

In contrast, the exemplary embodiments present the Universal Correspondence Network (UCN), a CNN-based generic discriminative framework that learns both geometric and semantic visual correspondences. Unlike many previous CNNs for patch similarity, the exemplary embodiments use deep metric learning to directly learn the mapping, or feature, that preserves similarity (either geometric or semantic) for generic correspondences. The mapping is, thus, invariant to projective transformations, intra-class shape or appearance variations, or any other variations that are irrelevant to the considered similarity. The exemplary embodiments propose a novel correspondence contrastive loss that allows faster training by efficiently sharing computations and effectively encoding neighborhood relations in feature space. At test time, correspondence reduces to a nearest neighbor search in feature space, which is more efficient than evaluating pairwise patch similarities.

The UCN is fully convolutional, allowing efficient generation of dense features. The exemplary embodiments propose an on-the-fly active hard-negative mining strategy for faster training. In addition, the exemplary embodiments propose a novel adaptation of the spatial transformer, called the convolutional spatial transformer, designed to make the features invariant to particular families of transformations. By learning optimal feature spaces that compensate for affine transformations, the convolutional spatial transformer imparts the ability to mimic patch normalization of descriptors.

The capabilities of UCN are compared to a few important prior approaches. Empirically, the correspondences obtained from the UCN are denser and more accurate than most prior approaches specialized for a particular task. This is demonstrated experimentally by showing state-of-the-art performances on sparse SFM (structure from motion) on KITTI (Karlsruhe Institute of Technology and Toyota Technological Institute at Chicago), as well as dense geometric or semantic correspondences on both rigid and non-rigid bodies in various other datasets.

To summarize, the exemplary embodiments propose a novel end-to-end system that optimizes a general correspondence objective, independent of domain, with the following main contributions:

Deep metric learning with an efficient correspondence contrastive loss for learning a feature representation that matches the correspondence task.

Fully convolutional network for dense and efficient feature extraction, along with fast active hard negative mining.

Fully convolutional spatial transformer for patch normalization.

State-of-the-art correspondences across sparse SFM, dense matching and semantic matching, encompassing rigid bodies, non-rigid bodies and intra-class shape or appearance variations.

Figure 1:
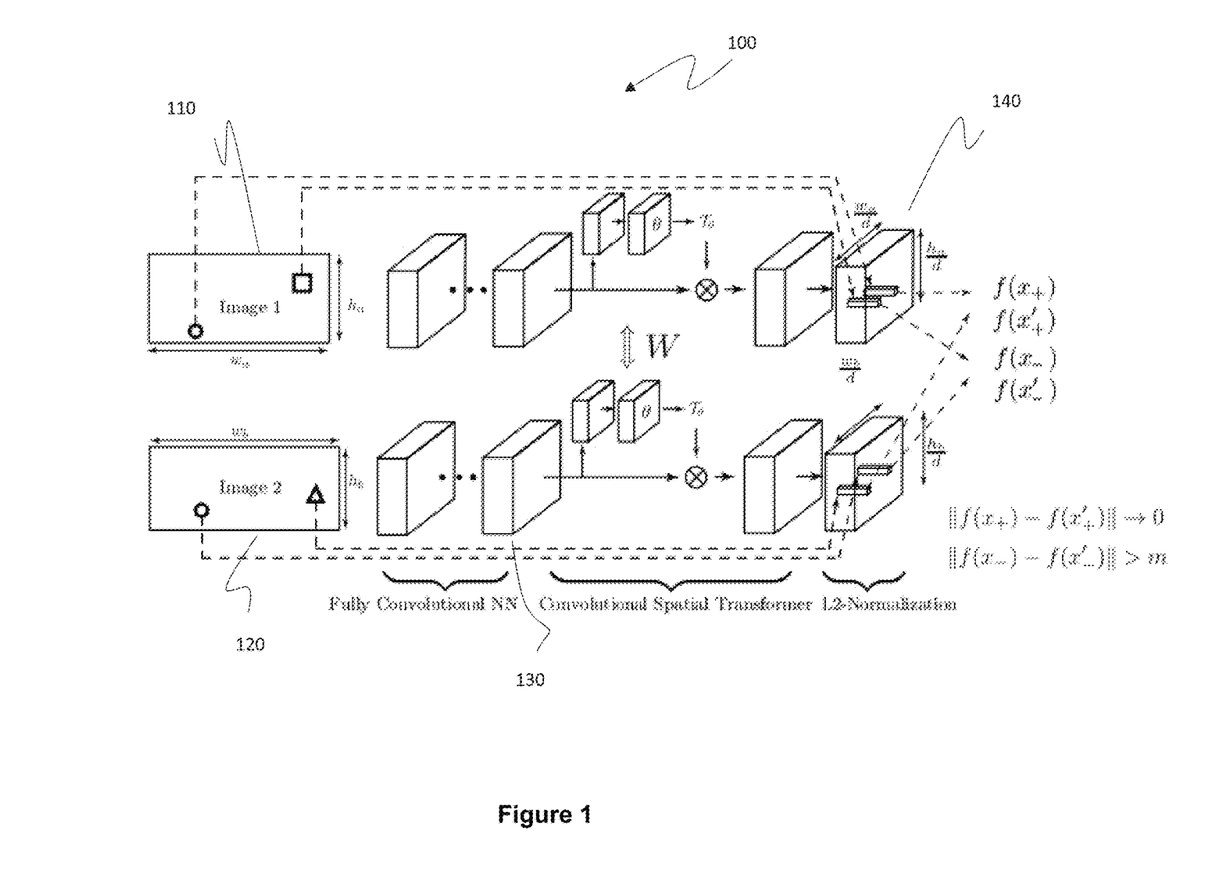
FIG. 1 is a fully convolutional neural network including a series of convolutions and a convolutional spatial transformer, in accordance with embodiments of the present invention.

Referring now in detail to the figures in which like numerals represent the same or similar elements and initially to FIG. 1, a fully convolutional neural network including a series of convolutions and a convolutional spatial transformer is shown, in accordance with embodiments of the present invention.

The system network 100 is a fully convolutional network that consists of a series of convolutions to create feature maps 130 and rectified linear units (ReLU), and a convolutional spatial transformer followed by correspondence contrastive loss. As inputs, the network 100 takes a pair of images 110, 120 and coordinates of corresponding points in these images. Features that correspond to the positive points (from both images 110, 120) are trained to get closer to each other, and the features that correspond to negative points are trained to move away from each other. The network 100 has a convolutional spatial transformer 140 that can normalize patches.

Visual features form basic building blocks for many computer vision applications. Carefully designed features and kernel methods have influenced many fields such as structure from motion, object recognition and image classification.

Recently, many CNN-based similarity measures have been proposed. In one example, a Siamese network can be used to measure patch similarity. A driving dataset is used to train a CNN for patch similarity in recent works, while other works also use a Siamese network for measuring patch similarity for stereo matching. CNN pre-trained on ImageNet can be analyzed for visual and semantic correspondence. Correspondences are learned in various works across both appearance and a global shape deformation by exploiting relationships in fine-grained datasets. In contrast, the exemplary embodiments of the present invention learn a metric space rather than optimizing for patch similarity, implement a fully convolutional architecture with a correspondence contrastive loss that allows faster training and testing and propose a convolutional spatial transformer for local patch normalization.

Neural networks are used for learning a mapping where the Euclidean distance in the space preserves semantic distance. The loss function for learning similarity metric using Siamese networks can be subsequently formalized. Recently, a triplet loss was used for fine-grained image ranking, while the triplet loss was also used for face recognition and clustering. Mini-batches can be used for efficiently training the network.

A CNN is invariant to some types of transformations such as translation and scale due to convolution and pooling layers. However, explicitly handling such invariances in forms of data augmentation or explicit network structure yields higher accuracy in many tasks. Recently, a spatial transformer network was proposed to learn how to zoom in, rotate, or apply arbitrary transformations to an object of interest.

Fully connected layers are converted in 1×1 convolutional filters to propose a fully convolutional framework for segmentation. Changing a regular CNN to a fully convolutional network for detection leads to speed and accuracy gains. Similar to these works, efficiency of a fully convolutional architecture is gained through reusing activations for overlapping regions. Further, since the number of training instances is much larger than the number of images in a batch, variance in the gradient is reduced, leading to faster training and convergence.

Figure 2:
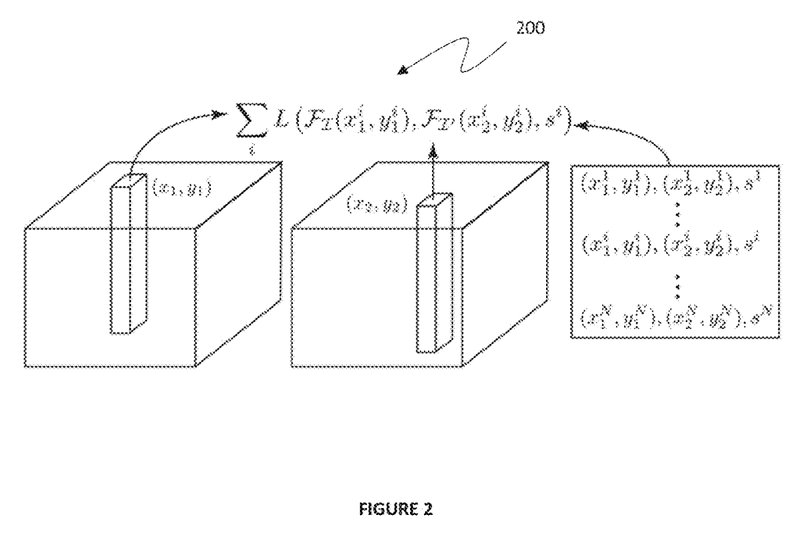
FIG. 2 is a diagram that illustrates corresponding contrastive loss, in accordance with embodiments of the present invention.

FIG. 2 is a diagram that illustrates corresponding contrastive loss 200, in accordance with embodiments of the present invention.

A Universal Correspondence Network (UCN) is trained to directly learn a mapping that preserves similarity instead of relying on surrogate features. The fully convolutional nature of the architecture, a novel correspondence contrastive loss for faster training and testing, active hard negative mining, as well as the convolutional spatial transformer that enables patch normalization are presented.

To speed up training and use resources efficiently, the exemplary embodiments implement fully convolutional feature learning, which has several benefits. First, the network can reuse some of the activations computed for overlapping regions. Second, several thousand correspondences can be trained for each image pair, which provides the network an accurate gradient for faster learning. Third, hard negative mining is efficient and straightforward, as discussed subsequently. Fourth, unlike patch-based methods, it can be used to extract dense features efficiently from images of arbitrary sizes.

During testing, the fully convolutional network is faster as well. Patch similarity based networks require $O(n^2)$ feed forward passes, where n is the number of keypoints in each image, as compared to only $O(n)$ for our network. It is noted that extracting intermediate layer activations as a surrogate mapping is a comparatively suboptimal choice since those activations are not directly trained on the visual correspondence task.

Learning a metric space for visual correspondence requires encoding corresponding points (in different views) to be mapped to neighboring points in the feature space. To encode the constraints, a generalization of the contrastive loss is proposed, called correspondence contrastive loss. Let $F(x)$ denote the feature in image I at location $x=(x, y)$. The loss function takes features from images I and I', at coordinates x and x', respectively (FIG. 2). If the coordinates x and x' correspond to the same 3D point, the pair is used as a positive pair that are encouraged to be close in feature space, otherwise as a negative pair that are encouraged to be at least margin m apart. Further, s=0 is denoted for a positive pair and s=1 is denoted for a negative pair. The full correspondence contrastive loss is given by:

$$L = \frac{1}{2N}\sum_{i}^{N} s_i \|\mathcal{F}_x(x_i) - \mathcal{F}_{x'}(x'_i)\|^2 + \quad (1)$$

$$(1 - s_i)\max(0, m - \|\mathcal{F}_x(x) - \mathcal{F}_{x'}(x'_i)\|)^2.$$

For each image pair, correspondences are sampled from the training set. For instance, for a KITTI dataset, if each laser scan point is used, up to 100 k points can be used in a single image pair. However in practice, 3 k correspondences are used to limit memory consumption. This allows more accurate gradient computations than traditional contrastive loss, which yields one example per image pair. It is noted that the number of feed forward passes at test time is $O(n)$ compared to $O(n^2)$ for Siamese network variants. Table 2, reproduced below, summarizes the advantages of a fully convolutional architecture with correspondence contrastive loss.

| Methods | # examples per image pair | # feed forwards per test |
|---|---|---|
| Siamese Network | 1 | $O(N^2)$ |
| Triplet Loss | 2 | $O(N)$ |
| Contrastive Loss | 1 | $O(N)$ |
| Corres. Contrast. Loss | $>10^3$ | $O(N)$ |

The correspondence contrastive loss in Eq. (1) consists of two terms. The first term minimizes the distance between positive pairs and the second term pushes negative pairs to be at least margin m away from each other. Thus, the second term is only active when the distance between the features $F_I(xi)$ and $F_{I'}(x'i)$ are smaller than the margin m. Such boundary defines the metric space, so it is important to find the negatives that violate the constraint and train the network to push the negatives away. However, random negative pairs do not contribute to training since they are generally far from each other in the embedding space.

Instead, mine negative pairs are activated that violate the constraints the most to dramatically speed up training. Features are extracted from the first image and find the nearest neighbor in the second image. If the location is far from the ground truth correspondence location, the exemplary embodiments use the pair as a negative. The nearest neighbor is computed for all ground truth points on the first image. Such mining process is time consuming since it requires O(mn) comparisons for m and n feature points in the two images, respectively. The experiments conducted use a few thousand points for n, with m being all the features on the second image, which is as large as 22000. The exemplary embodiments of the present invention use a GPU implementation to speed up the K-NN search and embed it as a Caffe layer to actively mine hard negatives on-the-fly.

Figure 3:
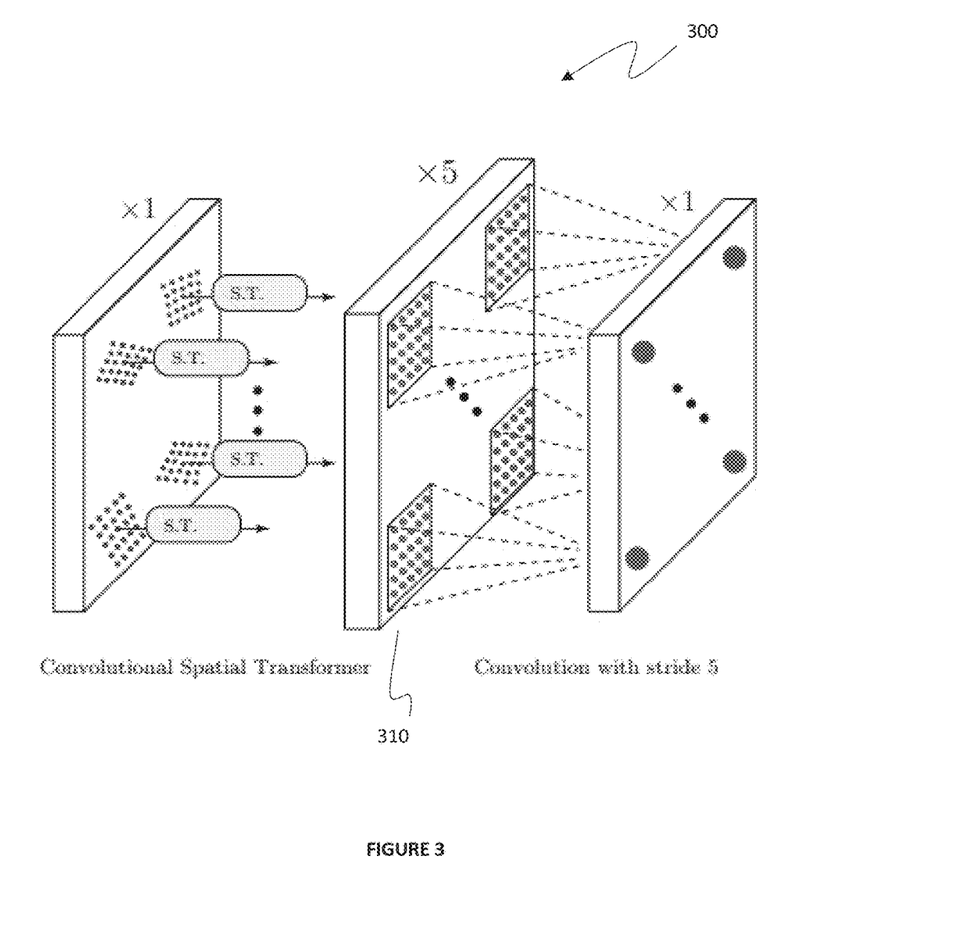
FIG. 3 is a convolutional spatial transformer, in accordance with embodiments of the present invention.

FIG. 3 is a convolutional spatial transformer 300, in accordance with embodiments of the present invention.

CNNs are known to handle some degree of scale and rotation invariances. However, handling spatial transformations explicitly using data-augmentation or a special network structure have been shown to be more successful in many tasks. For visual correspondence, finding the right scale and rotation is crucial, which is traditionally achieved through patch normalization. A series of simple convolutions and poolings cannot mimic such complex spatial transformations.

To mimic patch normalization, the idea of a spatial transformer layer is used. However, instead of a global image transformation, each keypoint in the image can undergo an independent transformation. Thus, the exemplary embodiments propose a convolutional version to generate the transformed activations, called the convolutional spatial transformer. This is especially important for correspondences across large intra-class shape variations.

The proposed transformer takes its input from a lower layer and for each feature, applies an independent spatial transformation. The transformation parameters are also extracted convolutionally. Since they go through an independent transformation, the transformed activations are placed inside a larger activation without overlap and then go through a successive convolution with the stride to combine the transformed activations independently. The stride size has to be equal to the size of the spatial transformer kernel size. FIG. 3 illustrates the convolutional spatial transformer module.

Figure 4:
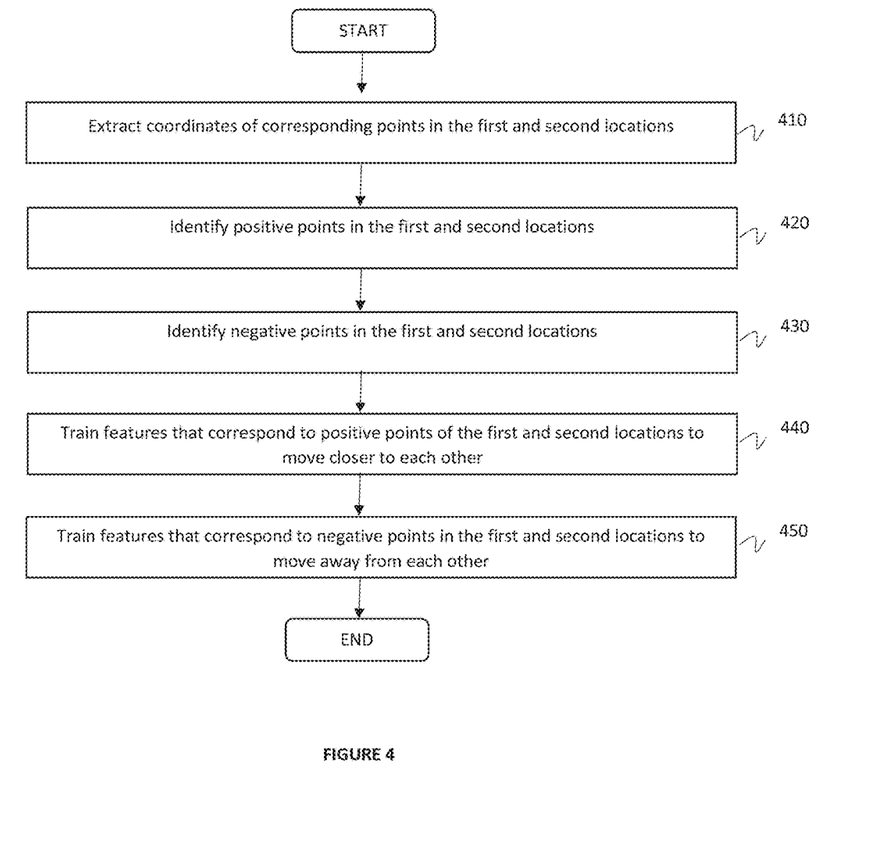
FIG. 4 is a block/flow diagram of a method for training a convolutional neural network (CNN), in accordance with embodiments of the present invention.

FIG. 4 is a block/flow diagram of a method for training a convolutional neural network (CNN), in accordance with embodiments of the present invention.

At block 410, coordinates of corresponding points in the first and second locations are extracted.

At block 420, positive points in the first and second locations are identified.

At block 430, negative points in the first and second locations are identified.

At block 440, features that correspond to positive points of the first and second locations are trained to move closer to each other.

At block 450, features that correspond to negative points in the first and second locations are trained to move away from each other.

The advantages of the present invention include (i) higher accuracy in feature matching since features in a metric space are directly learned to optimize a visual correspondence objective, (ii) more efficient training by reuse of activations in overlapping regions, (iii) faster training since thousands of correspondences can be trained for every image pair, and (iv) hard negative mining is efficient and straightforward, which leads to higher accuracy. The key steps that enable advantages for of the present invention are (i) a correspondence contrastive loss layer that directly learns a metric in feature space rather than optimizing a surrogate patch similarity objective, (ii) algorithms for efficient training for the correspondence contrastive loss with hard negative mining for increased accuracy, and (iii) patch normalization that can handle rotation and scaling effects through a fully convolutional spatial transformer.

In experiments, a Caffe package for neural network optimization was used. Caffe is a deep learning framework made with expression, speed, and modularity in mind. It is developed by the Berkeley Vision and Learning Center (BVLC) and by community contributors. Caffe is an expressive architecture that encourages application and innovation. Models and optimization are defined by configuration without hard-coding. A user can switch between central processing unit (CPU) and graphics processing unit (GPU) by setting a single flag to train on a GPU machine then deploy to commodity clusters or mobile devices. Caffe is also an extensible code that fosters active development. Additionally, speed makes Caffe great for research experiments and industry deployment. Caffe can process over 60M images per day with a single NVIDIA K40 GPU (graphics processing unit).

Since Caffe does not support the new layers proposed herein, the exemplary embodiments implement the correspondence contrastive loss layer and the convolutional spatial transformer layer, the K-NN layer and the channel-wise L2 normalization layer. The exemplary embodiments did not use a flattening layer nor the fully connected layer to make the network fully convolutional, generating features at every fourth pixel. For accurate localization, the exemplary embodiments extract features densely using bilinear interpolation to mitigate quantization error.

In conclusion, a novel deep metric learning approach to visual correspondence estimation is shown to be advantageous over approaches that optimize a surrogate patch similarity objective. The exemplary embodiments propose several innovations, such as a correspondence contrastive loss in a fully convolutional architecture, on-the-fly active hard negative mining and a convolutional spatial transformer. These lend capabilities such as more efficient training, accurate gradient computations, faster testing and local patch normalization, which lead to improved speed or accuracy. The exemplary embodiments demonstrate in experiments that the features perform better than prior state-of-the-art on both geometric and semantic correspondence tasks, even without using any spatial priors or global optimization.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
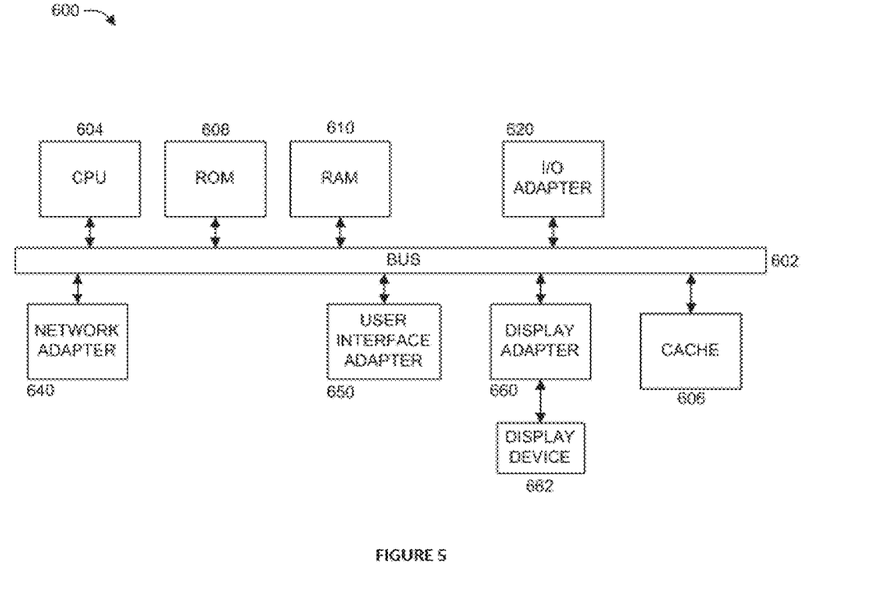
FIG. 5 is a block diagram of a processing system, in accordance with embodiments of the present invention.

Referring now to FIG. 5, an exemplary processing system 600 is shown. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a network adapter 640, a user interface adapter 650, and a display adapter 660, are operatively coupled to the system bus 602. A display device 662 can be operatively coupled to system bus 602 by display adapter 660.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a convolutional neural network (CNN), the method comprising:
   extracting coordinates of corresponding points in first and second locations;
   identifying positive points in the first and second locations;
   identifying negative points in the first and second locations;
   training features that correspond to positive points of the first and second locations to move closer to each other; and
   training features that correspond to negative points in the first and second locations to move away from each other;
   wherein a contrastive loss layer is trained with hard negative mining and by reusing activations in overlapping regions.

2. The method of claim 1, wherein the CNN has a fully convolutional spatial transformer for normalizing patches to handle rotation and scaling.

3. The method of claim 2, wherein the convolutional spatial transformer applies spatial transformations to lower layer activations.

4. The method of claim 1, wherein a contrastive loss layer encodes distances between the features of the first and second locations.

5. The method of claim 1, wherein hard negative pairs are mined that violate constraints.

6. A system for training a convolutional neural network (CNN), the system comprising:
   a memory; and
   a processor in communication with the memory, wherein the processor is configured to:
   extract coordinates of corresponding points in the first and second locations;
   identify positive points in the first and second locations;
   identify negative points in the first and second locations;
   train features that correspond to positive points of the first and second locations to move closer to each other; and
   train features that correspond to negative points in the first and second locations to move away from each other;
   wherein a contrastive loss layer is trained with hard negative mining and by reusing activations in overlapping re ions.

7. The system of claim 6, wherein the CNN has a fully convolutional spatial transformer for normalizing patches to handle rotation and scaling.

8. The system of claim 7, wherein the convolutional spatial transformer applies spatial transformations to lower layer activations.

9. The system of claim 6, wherein a contrastive loss layer encodes distances between the features of the first and second locations.

10. The system of claim 6, wherein hard negative pairs are mined that violate constraints.

11. A non-transitory computer-readable storage medium comprising a computer-readable program for training a convolutional neural network (CNN), wherein the computer-readable program when executed on a computer causes the computer to perform the steps of:
    extracting coordinates of corresponding points in the first and second locations;
    identifying positive points in the first and second locations;
    identifying negative points in the first and second locations;
    training features that correspond to positive points of the first and second locations to move closer to each other; and
    training features that correspond to negative points in the first and second locations to move away from each other;
    wherein a contrastive loss layer is trained with hard negative mining and by reusing activations in overlapping regions.

12. The non-transitory computer-readable storage medium of claim 11, wherein the CNN has a fully convolutional spatial transformer for normalizing patches to handle rotation and scaling.

13. The non-transitory computer-readable storage medium of claim 11, wherein the convolutional spatial transformer applies spatial transformations to lower layer activations.

14. The non-transitory computer-readable storage medium of claim 11, wherein a contrastive loss layer encodes distances between the features of the first and second locations.

15. The non-transitory computer-readable storage medium of claim 11, wherein hard negative pairs are mined that violate constraints.

* * * * *